Aug. 13, 1957 G. F. BREEHL 2,802,487
INTERLOCKING SHEET METAL JOINT
Filed March 28, 1955
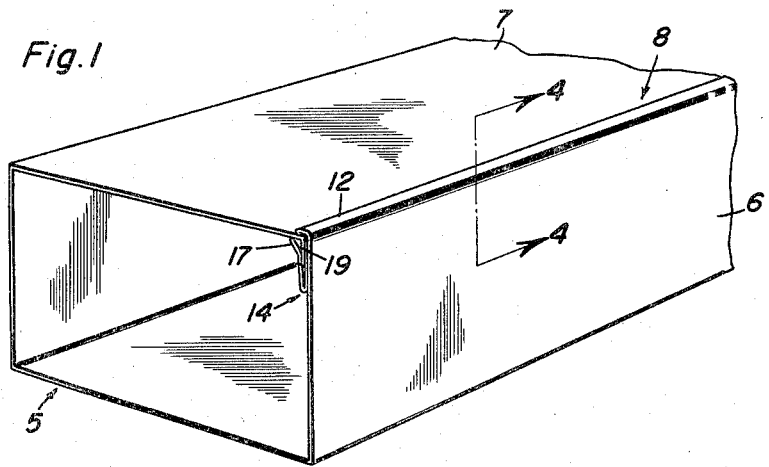
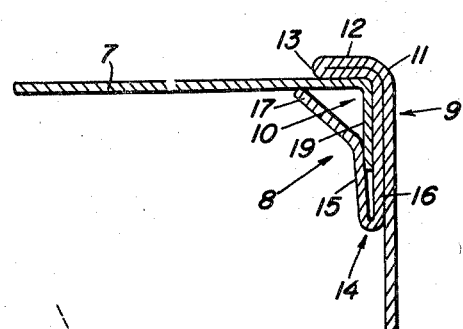
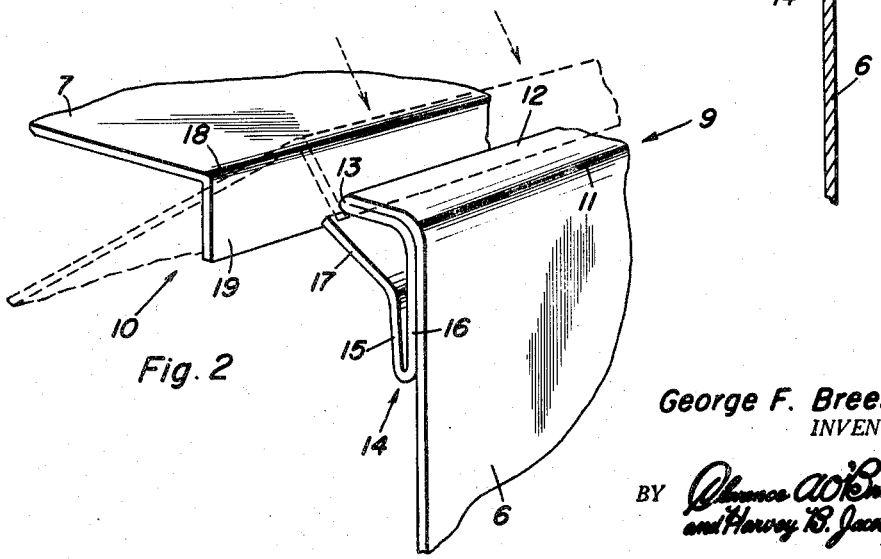
George F. Breehl
INVENTOR.

2,802,487
Patented Aug. 13, 1957

2,802,487

INTERLOCKING SHEET METAL JOINT

George F. Breehl, New Philadelphia, Ohio

Application March 28, 1955, Serial No. 497,200

3 Claims. (Cl. 138—74)

The present invention relates generally to new and useful improvements in polygonal sheet metal ducts, metal siding, etc., particularly the former, and has for its primary object to provide, in a manner as hereinafter set forth, a novel joint or seam for expeditiously and tightly joining the edges to be connected without the use of extraneous securing means or special tools, and with a minimum of labor.

Other objects of the invention are to provide an interlocking joint of the aforementioned character which will be comparatively simple in construction, strong, durable, compact and which may be manufactured at low cost.

These together with other objects and advantages which will become subsequently more apparent reside in the details of construction and operation as more fully hereinafter described and claimed, reference being had to the accompanying drawings forming a part hereof, wherein like numerals refer to like parts throughout, and in which:

Figure 1 is a perspective view of an end portion of a rectangular duct provided with a joint embodying the present invention;

Figure 2 is a fragmentary view in perspective with the parts or sections separated and showing, in dotted lines, the initial step to be taken when connecting the joint;

Figure 3 is a fragmentary view in end elevation, showing the second step when connecting the joint; and Figure 4 is a cross-sectional view through the joint, taken substantially on the line 4—4 of Figure 1.

Referring now to the drawing in detail, it will be seen that reference character 5 designates a rectangular duct of suitable resilient sheet metal, which duct may be of any desired dimensions. The duct 5 includes walls 6 and 7, the adjacent edges of which are connected by an integral interlocking joint 8. In the embodiment of the invention which has been illustrated, the joint 8 comprises female and male members 9 and 10, respectively, on the duct walls 6 and 7.

To form the female member 9, the wall 6 is folded longitudinally upon itself and bent, as at 11, to provide an inwardly right angularly extending flange 12 for the reception of the free longitudinal marginal portion of the wall 7 therebeneath, said flange 12 including a rounded edge or nose 13.

Depending from the lower leg of the flange 12 is a resilient socket 14 of substantially V-shaped cross-section, said socket including slightly upwardly divergent legs 15 and 16, the latter being in face abutting engagement with the wall 6. The upper portion of the leg 15 of the socket 14 is bent inwardly to provide an upwardly and inwardly inclined resilient guide and lip 17.

The free longitudinal marginal portion of the duct wall 7 is bent, as at 18, to provide the depending, right angularly extending flange 19 constituting the male member 10 of the joint 8.

It is thought that the manner in which the joint is locked will be readily apparent from a consideration of the foregoing. Briefly, the free longitudinal edges of the duct walls 6 and 7 are brought together and the flange 19 is introduced between the resilient lip 17 and the nose portion 13 of the flange 12, substantially as shown in Figure 2 of the drawing. The flange 19 is then slid downwardly on the lip 17, bringing the wall 7 to rest on said lip (see Figure 3). The wall 7 is then swung upwardly relative to the wall 6, engaging the angle 18 beneath the nose 13 of the flange 12. The wall 7 is now forced upwardly, said wall fulcruming and sliding forwardly on the lip 17 and snapping beneath the flange 12, the flange 19 entering and frictionally engaging the substantially V-shaped resilient socket 14 of the female member 9.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An interlocking joint of the character described comprising: a male and a relatively right angularly extending female member, said female member including an angularly extending flange and a substantially V-shaped, resilient socket depending from said flange, said male member being engageable beneath the flange and comprising an angularly bent flange engageable in the socket, said socket comprising divergent legs for the reception of the second named flange therebetween, one of said legs including an angularly extending resilient lip engageable at its free end beneath the male member for engaging same beneath the first named flange.

2. A resilient sheet metal duct comprising relatively right angularly extending walls including free adjacent edges, and a joint for connecting said edges, said joint comprising a female member on one of the walls and a male member on the other of said walls, said female member including an inwardly right angularly bent flange on said one wall and a substantially V-shaped, resilient socket depending from the flange and including upwardly divergent legs, one of said legs having face abutting contact with said one wall, said other wall being flat and engaging beneath the flange, said male member including a right angularly extending flange depending from said other wall and engaging in the socket, the other leg of said socket comprising an angularly bent, resilient lip engaging at its free end beneath said other wall for engaging same beneath the first named flange.

3. A resilient sheet metal duct comprising a wall having a free edge, the longitudinal marginal portion of said wall being folded upon itself and bent at right angles to provide a flange, an integral, substantially V-shaped resilient socket depending from the flange, said socket including slightly divergent legs, one of said legs having face abutting contact with said wall, said duct further including a second wall extending at substantially right angles to the first named wall and comprising a free longitudinal edge, and a right angularly bent flange on said free longitudinal edge of the second named wall engaging in the socket, said socket further including a resilient, angularly bent lip for directing the second named flange into the socket and engaging at its free end beneath the second named wall for engaging the same beneath the first named flange.

References Cited in the file of this patent

UNITED STATES PATENTS

| | | |
|---|---|---|
| 1,296,028 | Whittredge | Mar. 4, 1919 |
| 1,934,330 | Ruppelt | Nov. 7, 1933 |
| 2,259,382 | Ingels | Oct. 14, 1941 |
| 2,522,097 | Cookson | Sept. 12, 1950 |